May 16, 1933.  W. A. TRYON  1,908,799
WEAR COMPENSATING SPRING SHACKLE
Filed Oct. 15, 1931  2 Sheets-Sheet 1
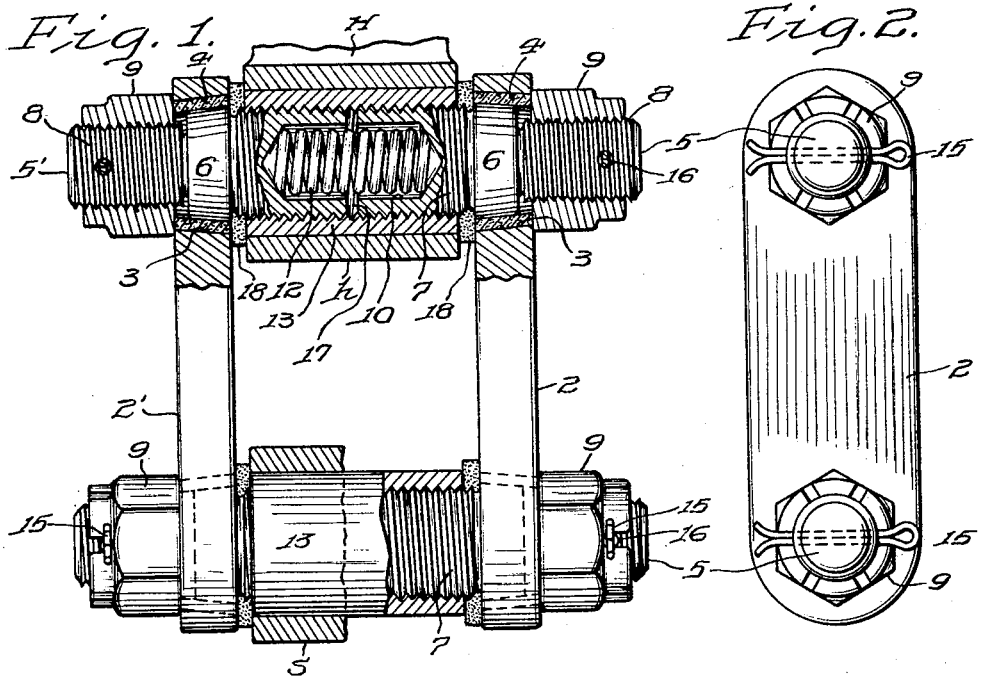
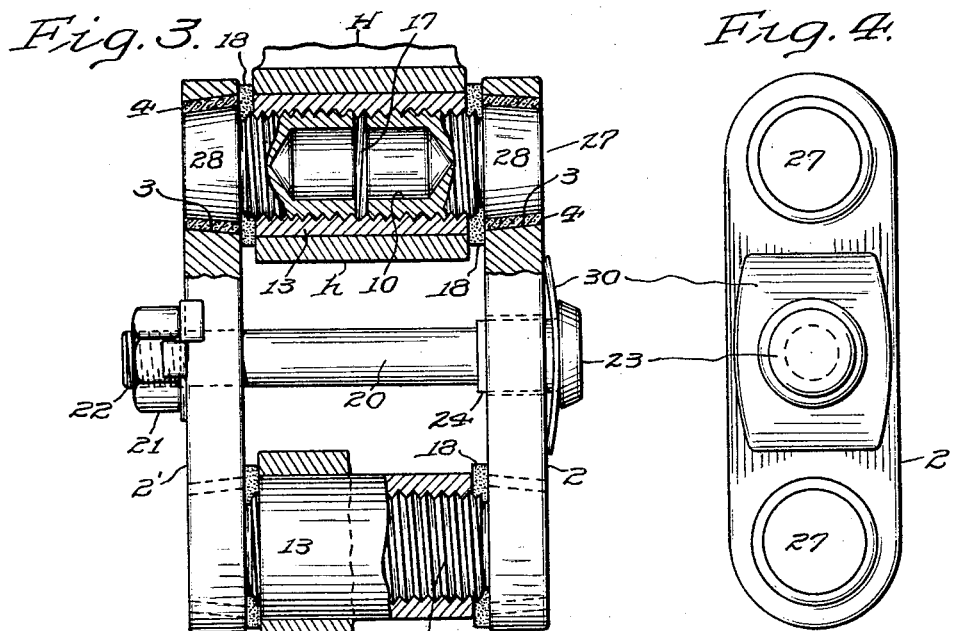
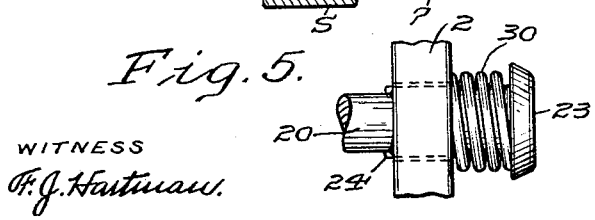
WITNESS
F. J. Hartman
INVENTOR
William A. Tryon.
BY
ATTORNEYS

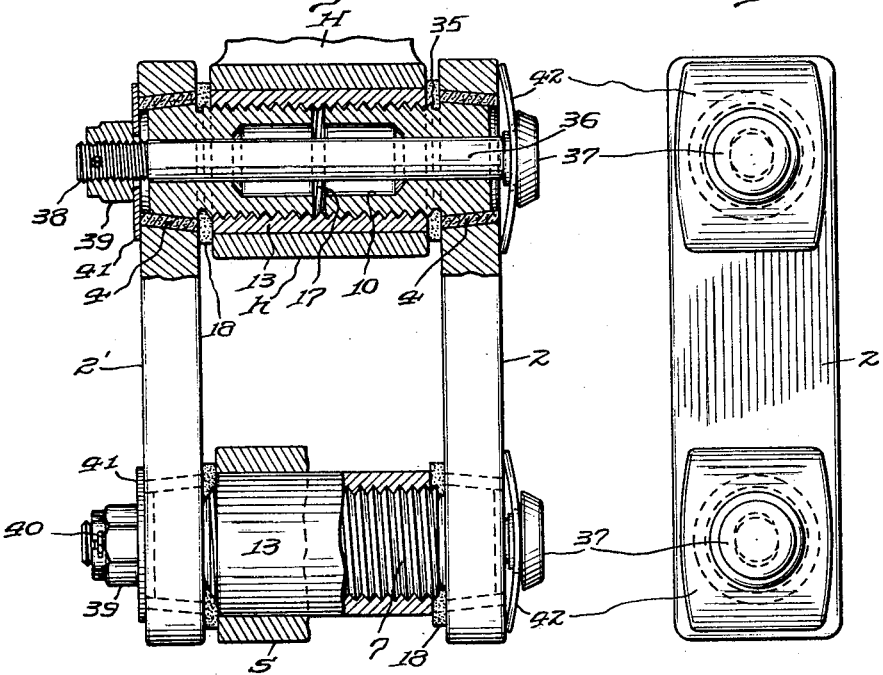

Patented May 16, 1933

1,908,799

UNITED STATES PATENT OFFICE

WILLIAM A. TRYON, OF ELMIRA, NEW YORK

WEAR COMPENSATING SPRING SHACKLE

Application filed October 15, 1931. Serial No. 568,923.

The present invention relates to shackles such as are commonly used for connecting the ends of automobile or other vehicle springs with the frame of the vehicle, either directly or through the medium of suitable hangers secured to the frame, so as to afford the requisite capacity for relative movement between the spring and the frame when the vehicle is traveling over a rough or undulating surface, the principal object of the invention being to provide an improved form of shackle so constructed as to automatically compensate for wear between its relatively moving parts and thereby preserve the requisite snugness of fit between them with consequent avoidance of looseness and rattling.

A further object of the invention is the provision of a shackle of the character just mentioned which presents a large area of contact between its relatively moving parts with consequent minimization of normal wear therebetween; which is simple in design and construction, may be manufactured at a relatively low cost, and is adapted for installation in place of the shackles commonly employed without requiring any structural changes or re-designing of existing models so that it may be readily utilized by automotive manufacturers for new cars or as replacements for the shackles already on existing cars.

A still further object of the invention is to provide a wear compensating shackle which is so constructed that it may be packed with grease, heavy oil, or other suitable lubricant at the time of installation in an amount sufficient to properly and automatically lubricate the wearing parts of the shackle for a very long period of use without any attention whatsoever and thus, in effect, provide a self-lubricating shackle which is satisfactorily operative in this regard for many thousands of miles before renewal of the lubricant supply is required, yet which is so arranged as to enable such renewal to be readily effected by any ordinary mechanic, or even by the car owner himself when it eventually becomes necessary.

An additional object of the invention is the provision of a spring shackle of the character aforesaid which, in its preferred embodiment, is provided with means operative to prevent or largely minimize the transmission of noises through the shackle to the body of the car of which it forms a component part, and which is thus effective to substantially insulate from the occupants thereof the sounds incident to the operation of the gearing in the rear axle and others of generally like character set up in the parts supported below the frame during the operation of the car.

Other objects, advantages and novel features of design, and arrangement comprehended by the invention are hereinafter more particularly pointed out or will be readily apparent to those skilled in the art from the following description of the invention during which reference will be had to the accompanying drawings in which I have illustrated several different forms of shackles embodying the principles thereof.

In the said drawings Fig. 1 is a view, partially in central section and partially in end elevation, of one of said shackles, and Fig. 2 is a side elevation thereof. Fig. 3 is a view generally corresponding to Fig. 1 of another of said shackles, and Fig. 4 a side elevation thereof, while Fig. 5 is a fragmentary detail showing another type of compensating spring which may be employed in the shackle shown in the two preceding figures. Fig. 6 is a view generally corresponding to Fig. 1 of still another shackle constructed in accordance with the invention, and Fig. 7 is a side elevation thereof, while Fig. 8 is a fragmentary detail, partially in elevation and partially in section, showing another form of compensating spring which may be utilized in the shackle shown in the two preceding figures. Fig. 9 is a fragmentary elevation of one end of a side link of the type which will generally be preferred for use in shackles of the types shown in the preceding figures, and Fig. 10 is a section on line 10—10 in Fig. 9 looking in the direction of the arrows, while Figs. 11 to 14, inclusive, are respectively fragmentary elevations corresponding to Fig. 9 showing other forms of side links which may be employed instead of those of the form shown in said figure. Throughout the drawings the same characters of reference are used to designate the same parts.

Referring now to that embodiment of the invention shown in Figs. 1 and 2 and which is designed to form a connecting medium between two relatively movable members such, for example, as a hanger H attached to the car frame and a spring S, only the eye of which is shown, it will be noted that the shackle comprises a pair of side links 2, 2′ disposed on opposite sides of the hanger eye h and the eye of the spring S which lies in the same vertical plane as the hanger eye. These links are identical in construction and may each therefore comprise a generally flat plate of metal of sufficient size and thickness to sustain the duty imposed upon it and having rounded ends adjacent each of which is provided a hole 3 preferably tapering outwardly from the inner face of the link, desirably at an angle of about 7½°, and in each of these holes, in accordance with the preferred practice of the invention, is seated a bushing or liner 4 of compressed paper, fibre or other non-metallic material for a purpose to be hereinafter described.

Extending through each of the holes 3 or through the non-metallic bushings or liners disposed therein if the latter be employed, is a stud generally designated as 5 and, as all of these studs are preferably alike, a description of one of them will apply equally to all the rest. Thus, each stud comprises a portion or zone 6 intermediate its ends which is shaped in conformity with the interior of the hole or its bushing so as to snugly seat therein; inwardly from this zone the stud is exteriorly threaded as at 7 to its inner extremity which, when the stud is operatively assembled in the shackle, terminates just short of a plane lying midway between the side links 2, 2′, while outwardly from the zone 6 the stud is reduced in diameter and externally threaded as at 8 for the reception of a preferably castellated nut 9 by means of which the zone 6 of the stud may be drawn tightly into the bushing 4, or hole 3 if the bushing be omitted, and thus locked against relative rotation with respect to the adjacent side link. It has been found that when the hole is of circular cross section (as shown in Figs. 9 and 10), this locking engagement may be readily effected when the respective tapers of the hole and conical zone 6 approximates 7½° as above stated, but this exact degree of taper is non-essential and, in fact, in some cases it may be preferred instead of providing holes of circular cross section in the side links to provide them with non-circular ones and to form the zone 6 on the stud in correspondence therewith. Thus, a hole of polygonal cross section, as shown in Fig. 11, may be employed or one of generally circular cross section but flattened on one side, as shown in Fig. 12, or one which is flattened on opposite sides, as shown in Fig. 13, or even a square opening, as shown in Fig. 14, but whatever be the specific type of hole or opening, it is desirable that the walls thereof, or at least a portion of said walls, be tapered inwardly from the inner face of the link toward its outer face, so that when the nut 9 is set up against the latter the stud will be drawn snugly into the hole or bushing as the case may be so that it is locked as well against longitudinal or axial movement relatively to the adjacent side link as against rotative movement with respect thereto.

Each of the studs is bored axially at its inner end to provide a chamber 10 the bottom of which may be conical, as shown, flat, or of any other suitable shape adapted to form a seat for the adjacent end of a coil spring 12 which is disposed in the axially aligned oppositely extending chambers in the correspondingly aligned studs 5, 5′ in a state of suitable compression and which thus tends to constantly force the studs apart.

Surrounding the threaded portions 7 of each aligned pair of studs, is a sleeve 13 interiorly threaded from one end to the other in correspondence with the threads on the studs, this sleeve being of suitable outside diameter to form a very tight fit in the eye h of the hanger or the eye of the spring S as the case may be so that after it is seated therein, ordinarily by pressing it into place, it is incapable of rotation in the part in which it is disposed.

In assemblying a shackle of the character just described, and assuming that the sleeves 13 have been pressed or otherwise rigidly seated in the eyes of the spring and hanger, the upper and lower studs on one side, for example, the studs 5′, are first screwed into place in the sleeves, the adjacent side link 2′ with the bushings 4 in its openings 3 (assuming the bushings are employed) is then slipped over the ends of the studs and the adjacent nuts 9 screwed into place and set up sufficiently to lock the studs and side link together, after which the cotter pins 15 may be passed through the castellated nuts and holes 16 drilled transversely in the studs in the usual way to prevent the nuts from backing off; if desired, however, plain nuts and other suitable forms of nut locking means may be utilized instead of the cotter pins. The springs 12 are then slipped into place and the chambers 10 packed with grease, heavy oil, or other suitable lubricant, after which the opposite studs 5 with their chambers similarly packed are screwed into position so as to place the spring under suitable compression, and in this connection it will be noted that the length of the inner ends of the studs is preferably so determined, as hitherto indicated, that their extremities will not reach the centers of the sleeves when the studs are screwed into the latter to the normal extent, thus leaving a clearance 17 between the inner faces of the studs to afford capacity for increasing the compression of the spring to an amount greater than that ordinarily utilized by merely screwing the studs in a little farther in cases in which such increased compression is desired.

It will thus be apparent that each of the sleeves 13 is capable of oscillation on the adjacent studs when the parts are operatively assembled, the faces of the threads on the studs bearing against corresponding faces of the threads in the sleeve and forming the wearing surfaces on which the relative movement of the parts takes place, and as the cooperating faces of the threads gradually wear when the shackle is in use, the springs 10 are effective to compensate for such wear by constantly urging the studs in each sleeve outwardly in opposite directions, thus continuously maintaining a proper bearing engagement between the cooperative thread faces in the sleeves and on the studs, preventing any looseness and consequent rattling and minimizing wear by avoidance of lost motion or play between the relatively moving parts throughout the life of the shackle. Moreover, as the bearing area or surface afforded by the cooperative faces of the threads is relatively great in comparison with the size of the parts, the normal wear is also correspondingly lessened because of distribution over a large surface, while as the angularity of the threads is slight and as the arc through which each sleeve turns from one limit position to the other under normal conditions of operation is not large, the endwise movement of the sleeves relatively to the shackle as a whole is negligible.

In the normal operation of the shackle, the grease or other lubricant contained in the chambers 10 gradually works out through the clearances 17 along the cooperating threads of the studs and sleeves so as to adequately and properly lubricate the contacting faces thereof, and as the amount of lubricant required for this purpose is small in comparison with the quantity contained in the chambers, the latter is sufficient to last for many thousands of miles of normal operation. If desired, small felt washers or the like, 18, may be disposed about the studs adjacent the inner faces of the side links so as to assist in confining the lubricant within the sleeves and prevent it from working out past the ends thereof with resultant wastage. The supply of lubricant in the chambers can be readily renewed, however, should it become exhausted after a long period of use by simply removing one of the side links and unscrewing the adjacent studs so as to enable the chambers to be re-packed.

I have thus provided a wear compensating and self-lubricating shackle which, when once assembled on the car, requires no attention whatsoever for many thousand miles and which is eminently satisfactory in the performance of its intended function of connecting the springs and frame in such manner as to permit the requisite relative movement between these parts. Moreover, through the employment of the fibre or other non-metallic bushings or liners 4, metal-to-metal contact between the studs and side links is avoided, and the transmission of rear axle noises and the like from the springs through the shackles and thence to the frame is so minimized that such noises become substantially inaudible to the occupants of the car. Additionally, as hitherto pointed out, the wearing surfaces of the shackle are relatively large so that the normal wear incident to use is correspondingly slight while the construction of the shackle is such as to resist side sway and rolling of the vehicle to a maximum extent.

In the shackle shown in Figs. 3 and 4, the side links 2, 2' are constructed substantially like those hitherto described except for the fact that they are bored midway between their ends to enable a bolt 20 to be passed transversely through them, this bolt, which carries a nut 21 at its projecting threaded end 22, serving to maintain the side links and other parts in assembled relation. Desirably, the bore in the link designed to lie adjacent the head 23 of the bolt is made elliptical or of other non-cylindrical form to receive a correspondingly elliptical boss 24 formed on the shank of the bolt below its head so that the bolt is prevented from turning in the link when assembled therein, while the bore in the other link is made cylindrical and of a size to easily receive the bolt. In this form of the invention the studs 27 are preferably provided with tapered zones 28, corresponding to the zones 6 on the studs 5, which cooperate with the bushings 4 in the links or directly with the holes 3 in the latter if the bushings are not employed. The studs are not extended outwardly, however, beyond the outer ends of the said zones but are otherwise constructed similarly to the studs 5 and thus are adapted to receive on their threaded inner ends the sleeves 13 which are respectively rigidly seated in the eyes of the hanger H and spring S. Instead of utilizing coil springs 12 in the chambers of the studs to urge the latter outwardly in opposite directions to effect the requisite compensation for wear between the cooperating faces of the threads, I utilize, in this form of the invention, a single spring 30 disposed between the head of the bolt 20 and the adjacent outer face of the link 2, this spring being adapted when the parts are assembled to constantly urge the side links and their respective studs oppositely inward toward each other so as to maintain suitable bearing engagement at all times between the threads on the studs and those in the sleeves respectively surrounding them. The spring 30 may be either of the plate type as shown in Figs. 3 and 4 and arranged to bear at its extremities on the face of the link and at its center on the under face of the bolt head, or of the coil type as shown in Fig. 5, in which case it is disposed about the bolt between the outer face of the link and the inner face of the head, the function and operation of the spring in either case being the same.

A shackle of the character of that just described will frequently be preferred to one of the type shown in Figs. 1 and 2 as it is generally somewhat cheaper to manufacture as less machine work is required as well as but a single spring instead of two springs, while as the chambers 10 are not in part occupied by the coil springs, a greater amount of lubricant can be initially placed therein so that lubrication of the shackle is effected for a correspondingly longer period before the lubricant is exhausted. It will be noted that felt washers 18 are shown adjacent the ends of the sleeves in Figs. 3 and 4 but it will of course be appreciated that they may be omitted at these points if desired.

In Figs. 6 and 7 I have shown still another form of shackle constructed in accordance with my invention and in which a pair of connecting bolts respectively extending through each pair of axially aligned studs are employed instead of a single bolt 20 near the center of the links. In this form of the invention the side links 2, 2′ are similar to those hitherto described, save that their ends are desirably more nearly square so as to give a better bearing for the ends of the springs which are disposed adjacent thereto. Likewise, the studs 35 are generally similar to the studs 27 save for the fact that they are axially bored for the passage of the bolts 36, the inner ends of the bores being enlarged to form the chambers 10 in the usual way. The preferably tapered zones 28 at the ends of the studs are thus effective to seat in the bushings 4 or in the holes in the studs if the bushings are omitted, while the inner threaded ends of each pair of aligned studs receive one of the sleeves 13 which are respectively seated in the eye of the hanger and of the spring in a manner similar to that to which reference has already been made. Each of the bolts 36 is provided with a head 37 and at its opposite projecting end is threaded as at 38 for the reception of a nut 39 which is desirably castellated so that after being screwed up to the proper extent it may be locked in place through the medium of a cotter pin 40 passing through a small hole bored transversely of the bolt, while a washer 41 of greater diameter than the small end of the opening in the adjacent side link is disposed between the nut and the outer face of the link so as to afford a bearing for the former. At the opposite end of each bolt, a spring 42 is disposed which may be either of the plate type as shown in Figs. 6 and 7 or of the coil type as shown in Fig. 8. If of the plate type, the ends of the spring are arranged to bear on the outer face of the link and the center of the spring upon the inner face of the bolt head, while if a spring of the coil type is employed, a washer 43, desirably substantially similar to the washer 41, is interposed between the inner end of the spring and the adjacent face of the link so as to afford a seat for the former, which thus surrounds the bolt between the outer face of the washer and the inner face of the bolt head and is maintained in a suitable state of compression at all times. It will thus be apparent that the springs 42 are operative to constantly urge the side links and their respective studs inwardly toward each other so as to maintain proper bearing engagement between the threads on the studs and those in the sleeves 13, while as the bolts are arranged to form a fairly snug fit in the studs and as no relative movement takes place between those parts, substantially no leakage of the lubricant can occur from the outer ends of the grease filled chambers 10, although if desired and with a view to preventing such leakage, a felt washer or other grease retaining means may be disposed at the bottom of each chamber around the bolt.

More especially in the forms of the invention last described, in which one or more bolts are utilized to maintain the parts in assembled relation, it may sometimes be found desirable to employ openings in the side links of non-circular cross section such, for example, as are shown in Figs. 11 to 14, inclusive, and to form the zones on the studs which are designed to fit therein in correspondence therewith so as to insure against any possible rotation of the studs in the links under any conditions of operation which may be encountered, although normally the tension of the springs 30 or 42, as the case may be, is sufficient to prevent such relative rotation even though the zones of the studs and the openings in the links are of circular cross section provided they are longitudinally tapered as described. Moreover, while I prefer to utilize tapered openings in the links and studs having correspondingly tapered zones as this affords a satisfactory means of maintaining the studs in rigid and non-rotatable relation with the side links in the assembled shackle, other constructions adapted to effect the same ultimate result may be employed if desired.

It may be noted in connection with the self-lubricating feature of my improved shackle in any of the forms to which I have referred, that the grease or other lubricant is only distributed outwardly along the cooperating threads of the sleeves and studs when relative movement is taking place therebetween, so that when the car of which the shackle forms a component part is at rest, no feeding of the lubricant from the chambers 10 occurs, a condition which tends to prolong the time when renewal of the lubricant initially placed in the shackle is required.

While the principles of the present invention are of particular advantage when utilized in a spring shackle and I have in consequence referred more especially herein to such application thereof, they may be employed with equal facility and benefit in other devices adapted to form connecting mediums between relatively movable members, and as such employment is fully within the scope and purview of the invention, it is therefore to be understood that nothing herein contained is to be construed as limiting or confining the invention to spring shackles alone.

Moreover, while I have by way of example herein illustrated and described certain spring shackles constructed in accordance with my invention, I do not thereby desire or intend to restrict its use when embodied in spring shackles to the specific forms thereof to which I have chosen to refer, as the principles of the invention may be readily embodied in shackles and/or wear compensating bearings of other types and/or numerous changes and modifications may be made in the details of design, construction and arrangement of the various elements if desired, without departing from the spirit and scope of the invention as defined in the appended claims.

Having thus described my invention, I claim and desire to protect by Letters Patent of the United States:

1. In means forming a connection between two relatively movable elements, an internally threaded sleeve, a pair of oppositely disposed externally threaded studs extending into said sleeve, means independent of the sleeve adapted to support the extremities of said studs, and resilient means operative to continuously urge said studs in opposite directions with respect to the sleeve to thereby maintain constant bearing engagement between the threads on the studs and those in the sleeve.

2. In means adapted to form a connection between relatively movable elements, an internally threaded sleeve, a pair of externally threaded studs extending into the opposite ends of the sleeve, the inner end of each stud being provided with a lubricant receiving chamber, means adapted to respectively support the outer ends of the studs beyond the sleeve, and means operative to yieldingly urge the studs in opposite directions with respect to the sleeve to thereby maintain a constant bearing engagement between the threads on the studs and those in the sleeve.

3. In means adapted to form a connection between two relatively movable elements, an internally threaded sleeve adapted to seat in one of said elements, a pair of studs having externally threaded inner ends respectively received in the opposite ends of the sleeve, means respectively adapted to support the outer ends of the studs beyond their threaded portions, and resilient means operative to urge the studs in opposite directions with respect to the sleeve to thereby maintain a constant bearing engagement between their threads and those in the sleeve.

4. In means adapted to form a connection between two relatively movable elements, an internally threaded sleeve adapted to seat in one of said elements, a pair of studs having externally threaded inner ends respectively received in the opposite ends of the sleeve, each of said studs having a lubricant receiving chamber in its inner end, means respectively adapted to receive and support the outer ends of the studs beyond their threaded portions in non-rotatable relation with respect to said means, and resilient means operative to urge the studs in opposite directions with respect to the sleeve to thereby maintain a constant bearing engagement between their threads and those in the sleeve.

5. In a spring shackle, the combination of a pair of laterally spaced side links, an internally threaded sleeve disposed between said links, a pair of oppositely disposed studs respectively carried by the links and having externally threaded inner ends extending into the opposite ends of the sleeve, means for preventing axial rotation of the studs in the links, and resilient means operative to normally urge the studs in opposite directions with respect to the sleeve to thereby maintain bearing engagement between their threads and those in the sleeve.

6. In a spring shackle, the combination of a pair of laterally spaced side links, an internally threaded sleeve disposed therebetween, a pair of studs externally threaded on their inner ends and extending into the sleeve, each stud deriving support from the adjacent side link and being restrained from rotation with respect thereto, means operative to maintain the side links in assembled position on the studs, and spring means operative to constantly urge the studs in opposite directions with respect to the sleeve to thereby maintain bearing engagement between their threads and those in the sleeve.

7. In a spring shackle, a pair of laterally spaced side links each having an outwardly tapering opening, an internally threaded sleeve disposed between the links, a pair of studs each having an externally threaded inner end extending into the adjacent end of the sleeve and a tapered zone received in the opening in the adjacent link, means adapted to hold the links in assembled position on the tapered zones of the studs, and resilient means operative to constantly urge the studs in opposite directions with respect to the sleeve.

8. In a spring shackle, a pair of laterally spaced side links each having an outwardly tapering opening, an internally threaded sleeve disposed between the links, a pair of studs each having an externally threaded inner end extending into the adjacent end of the sleeve and a tapered zone received in the opening in the adjacent link, means adapted to hold the links in assembled position on the tapered zones of the studs, and resilient means operative to constantly urge the studs in opposite directions with respect to the sleeve, the inner ends of the studs lying in spaced relation to each other within the sleeve and being provided with outwardly extending lubricant receiving chambers.

9. In a spring shackle, a pair of laterally spaced side links respectively provided with aligned openings, an internally threaded sleeve disposed therebetween, a pair of studs respectively extending through the openings in the links and having zones cooperative with the walls thereof, the inner end of each stud being externally threaded and extending into the adjacent end of the sleeve and the outer end having a threaded region projecting outwardly beyond the adjacent link, a nut on each said last mentioned threaded region adapted to hold the stud and link in assembled relation, and a spring contained within and extending between the inner opposed ends of the studs and operative to constantly urge them in opposite directions with respect to the sleeve.

10. In a spring shackle, the combination of a pair of laterally spaced side links each provided with a tapered opening, a pair of studs respectively provided with tapered zones conforming to said openings and seating therein, the inner ends of said studs being externally threaded and provided at their extremities with axially disposed chambers and the outer ends of the studs extending through the links and having external threads, nuts carried by said outer ends operative to hold the studs and links in assembled relation, an internally threaded sleeve surrounding the inner ends of the studs, and a coil spring disposed in said chambers and operative to constantly urge the studs in opposite directions with respect to the sleeve.

11. In a spring shackle, the combination of a pair of laterally spaced side links, each provided with an opening, a pair of studs having zones respectively seating in said openings, the inner ends of the studs projecting oppositely from the inner faces of the links and provided with external threads, an internally threaded sleeve surrounding said inner ends of both studs with its threads in cooperative engagement with the external threads thereon, a bolt adapted to maintain the side links and studs in assembled relation, and resilient means cooperative with the bolt and adapted to constantly urge the studs in opposite directions with respect to the sleeve to thereby maintain bearing engagement between the threads on the studs and those in the sleeve.

12. In a spring shackle, the combination of a pair of laterally spaced side links, each having a tapered opening, a pair of studs each having a tapered zone respectively received in one of said openings and an end projecting from the inner face of the adjacent link and provided with external threads, an interally threaded sleeve surrounding the threaded ends of the studs with its threads in cooperative engagement therewith, a bolt extending transversely through both links operative to maintain the parts in assembled relation, and resilient means adapted to constantly urge the studs in opposite directions with respect to the sleeve to thereby maintain bearing engagement between the threads on the studs and those within the sleeve.

13. In a spring shackle, the combination of a pair of laterally spaced side links, each having a tapered opening, a pair of studs each having a tapered zone respectively received in one of said openings and an end projecting from the inner face of the adjacent link and provided with external threads, an internally threaded sleeve surrounding the threaded ends of the studs with its threads in cooperative engagement therewith, a bolt extending transversely through both links operative to maintain the parts in assembled relation, and resilient means cooperative with the bolt adapted to constantly urge the studs in opposite directions with respect to the sleeve to thereby maintain bearing engagement between the threads on the studs and those within the sleeve, the inner end of each of said studs being provided with a lubricant receiving, axially extending chamber.

14. In a spring shackle, a pair of laterally spaced side links each provided with a tapered opening, a lining of non-metallic material within said opening, a pair of studs provided with tapered zones respectively seating in said linings and with externally threaded portions extending inwardly from the adjacent links, an internally threaded sleeve surrounding the threaded portions of the studs, means adapted to maintain the studs in assembled relation with the side links, and resilient means operative to constantly urge the studs in opposite directions with respect to the sleeve.

15. In a spring shackle, a side link having a tapered opening, a lining of fibrous, non-metallic material disposed therein, a stud having a tapered zone seating in said lining and another portion projecting without the plane of the link, and means operative to maintain the stud and link in assembled relation.

16. In a spring shackle, a pair of laterally spaced side links each provided with an opening, a lining of non-metallic material within said opening, a pair of studs provided with zones respectively seating in said linings and with externally threaded portions extending inwardly from the adjacent links, an internally threaded sleeve surrounding the threaded portions of the studs, means adapted to maintain the studs in assembled relation with the side links, and resilient means operative to constantly urge the studs in opposite directions with respect to the sleeve.

17. In means adapted to form a connection between two relatively movable members, an internally threaded sleeve rigidly supported by one of said members, a pair of externally threaded studs extending into the opposite ends of the sleeve with their respective threads in cooperative engagement with the threads therein, means interconnecting the studs with the other member, and resilient means operative to constantly urge the studs in opposite directions with respect to the sleeve.

18. In a spring shackle, the combination of a pair of laterally spaced side links, an internally threaded sleeve disposed between said links, a pair of oppositely disposed externally threaded studs respectively extending into the links, the inner ends of the studs extending into the opposite ends of the sleeve, means for preventing axial rotation of the studs in the links, and resilient means operative to normally urge the links in opposite directions with respect to the sleeve to thereby maintain bearing engagement between the threads on the studs and those in the sleeve.

In witness whereof, I have hereunto set my hand this 13th day of October 1931.

WILLIAM A. TRYON.